July 10, 1945. A. H. SCHUTTE 2,379,993

CENTRIFUGAL

Filed Dec. 7, 1940

INVENTOR
August Henry Schutte
BY Nathaniel Ely
ATTORNEY

Patented July 10, 1945

2,379,993

UNITED STATES PATENT OFFICE 2,379,993

CENTRIFUGAL

August Henry Schutte, Bronxville Manor, N. Y.

Application December 7, 1940, Serial No. 368,983

9 Claims. (Cl. 210—63)

This invention relates to improvements in the centrifugal separation of mixtures of materials by virtue of their differences in melting points and is more particularly an improvement in the invention disclosed in my issued patent, No. 2,168,-306.

I have found that it is commercially practicable to separate mixtures of materials having different melting points by centrifugal separation, and more particularly I have been especially successful in the separation of wax and oil mixtures such as heretofore practiced by sweating. The application of centrifugal force materially expedites the separation and produces an unusually high degree of purity of the resultant products.

The principal object of my present invention is to provide an improved method and apparatus for controlling the temperature of centrifugal operations within a relatively small degree of variation.

A more particular object of my invention is to provide a system of controlling the temperature of different parts of a centrifugal and to prevent the uncontrolled heating or cooling thereof by windage, thereby facilitating the separation of materials at or near their melting points.

A still further object of the invention is to provide a method and means for maintaining a predetermined atmospheric condition surrounding the cake formation zone whereby uniform operating results and effective automatic control can be obtained.

Further objects and advantages of my invention will appear from the following description of a preferred form of embodiment thereof taken in connection with the attached drawing illustrative thereof and in which.

Figure 1:
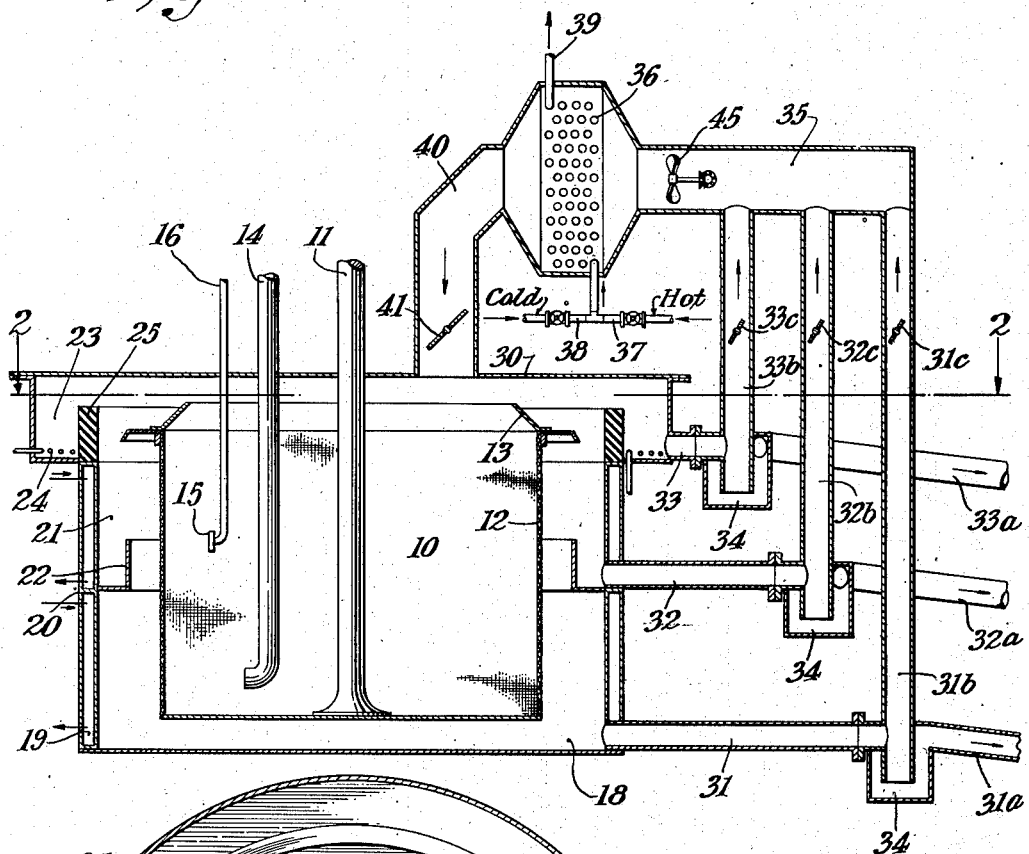
Fig. 1 is a diagrammatic vertical section taken generally along the line 1—1 of Fig. 2.
Figure 2:
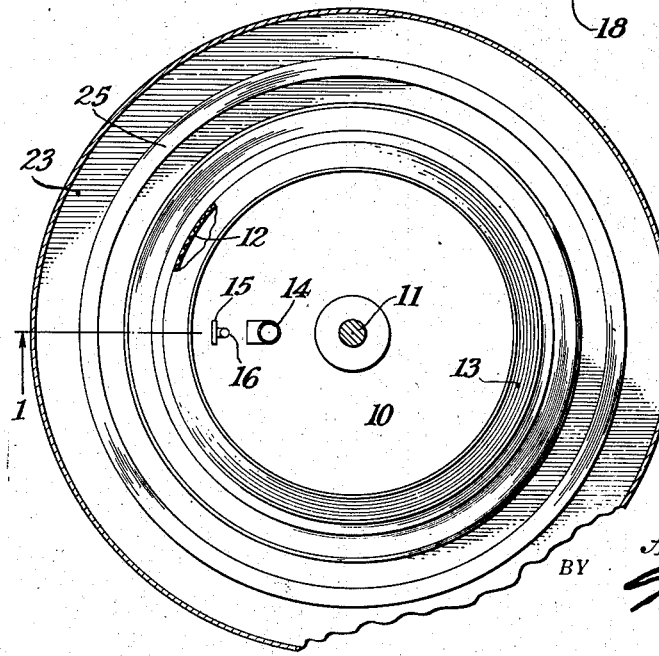
Fig. 2 is a horizontal section taken substantially along the line 2—2 of Fig. 1.

As described in my previous patent, I have found that, by forming an emulsion of a mixture of materials having different melting points and feeding such materials to a suitable filter, I have been able to remove the liquid constituents through the filter and thereby form a relatively dry cake of the remaining material. During the formation of the cake, I usually apply a wash material not only to increase the purity of the ultimate cake but to obtain intermediate melting point material which, if desired, may be recycled for the most efficient yields.

At the present time, I have found that centrifugal filters are most effective with hydrocarbon waxes, but it is necessary to maintain very close temperature conditions, for the change from a liquid to a solid involves only a few degrees temperature difference, and, with centrifugals of 48 inches to 60 inches in diameter, operating at relatively high speeds, the windage is so great as to influence the temperature conditions. If there is an appreciable drop in temperature, the filtration ceases because of solidification of the materials, and with a rise in temperature there is an unsatisfactory separation of the desired melting point materials.

In accordance with my invention, I provide a centrifugal filter generally indicated at 10, which is driven by a suitable shaft 11 and is provided with a coaxial, cylindrical, foraminous wall 12 surmounted by the discharge lip 13. To such a filter the emulsified material is fed as by the pipe 14, and I find that a cake can be readily formed on the wall 12, and, under conditions of continued feed of additional heavy slurry, the cake will be continually discharged over the top of the lip 13. Wash liquid may be applied to such cake by the spray 15 receiving wash material through the pipe 16. The cake thickness is determined by the lip.

In the operation of such a device, the liquid constituents of the feed will pass through the foraminous wall and collect in the filtrate collection zone 18. This zone can be heated or cooled by an appropriate circulation of a heat transfer medium in the chamber 19 of the multiple chamber filter housing generally indicated at 20.

By the application of suitable wash material, it is also possible to remove a liquid material intermediate the point of slurry feed and cake discharge, and I, therefore, provide a compartment 21 formed by the channel member 22 for the reception of this intermediate cut of material.

As mentioned before, the cake is discharged over the top of the lip 13 into the cake receiving chamber 23. Inasmuch as this material is solid, it is preferably liquefied by providing heating coils 24 so that it can be removed from the machine. An insulating wall 25 may be used to prevent the heat from such chamber from penetrating to the centrifugal basket 10.

In operation I find that the normal rotation of the large centrifugals causes such windage that, even though the temperatures of the respective chambers of the housing 20 are separately controlled, it is difficult to maintain appropriate temperatures which will prevent the congealing of the filtrate at the bottom or at intermediate drawoff points so that there can be the desired separation according to melting points.

The principal feature of my invention is, therefore, to provide controlled temperature conditions within such a centrifugal by the conditioning of the atmosphere therein. Furthermore, it is not practicable to condition the entire centrifuge because of its various temperature variations necessary for operation and the difficulty of directly adding the desired amount of heat at the desired point.

To overcome the foregoing difficulties, I provide a cover 30 which extends across the entire machine and prevents the inflow of any air except as provided, as hereinafter described. At each material outlet including the filtrate outlet 31, the intermediate cut outlet at 32, and the cake outlet at 33 I also provide a trap 34, through which the liquid material must pass. The liquid material then continues out the extensions 31a, 32a, and 33a of the respective material outlets, but the vapors are separated and removed through vertical pipes 31b, 32b, and 33b. Each of these pipes may be provided with a damper or other volume control regulator generally indicated at 31c, 32c, and 33c respectively, and each of these pipes 31b, 32b, and 33b preferably discharges into a common header 35.

The header 35, which thus carries all of the vapors discharged from the filter, is provided with a heat exchanger 36, which is provided with hot and cold heating media inlets 37 and 38 respectively, which inlets are provided with appropriate valves so that either hot or cold materials may be passed through the device to the discharge 39 as is commonly understood with such an apparatus. The vapors are thereby heat conditioned in the heat exchanger 36 and then pass through the header 40 provided with a damper 41 through the cover 30 to the top of the machine housing.

The operation of the device will be understood substantially from the foregoing description, it being noted that under normal operation the temperature of the respective filtrate, intermediate cut, and cake outlets and of the feed and air inlet will be regulated by suitable temperature responsive devices (not shown). Each of the dampers 31c, 32c, and 33c will be directly controlled by the temperature of the materials in the respective liquid outlets, and the indication of a change in temperature will cause a change of the damper setting so that the temperature at the liquid outlet can be maintained at the desired degree.

It will be apparent that the continued inflow of heat-conditioned vapors will not affect the temperature of the outlets unless the heat conditioned vapors pass out of the outlets. For example, if the vapors are heated, they cannot increase the temperature at the bottom of the centrifuge unless the damper 31c is opened sufficiently wide as to permit a flow of vapors in this direction. If the damper 31c is closed, the effect of the heat will only be effective at the liquid discharge of intermediate product at 32 and cake at 33. Furthermore, it will be noted that the temperature of operation is such that the lowest operating temperature is at the bottom of the centrifuge and the highest temperature is at the top. This results in a minimum disturbance of conditions, for the temperature of the lower part of the centrifuge can only be varied 2 to 4° F. without materially disturbing or causing a change in the material at the bottom of the centrifuge which will cause a plugging-up of the filter or change the melting point of the materials.

As an example of the operating conditions on one machine which operated with success, the temperatures of air outlet from the top (corresponding to 33), from the intermediate point (corresponding to 32), and from the bottom (corresponding to 31) were maintained at 130°, 96°, and 92° F. respectively. The air temperature inside the centrifugal was 105° at the point of feed. The emulsion charge was at 90° and the wash was at 90°.

The windage of the centrifuge can thus be readily compensated for by the desired control of the outlet vapors. If the temperature drops, tending to chill the filtrate, the control 31c permits a greater passage of warm air at the zone of the filtrate. Each zone is independently controlled by the ultimate desired temperature, it being possible to vary the vapor discharge volume from zero to maximum. A highly accurate control can be obtained and, if desired, a fan may be provided at 45 to more rapidly force the vapors through the unit heater.

The recirculation of vapors through the heat exchanger is a preferred arrangment of operation because of the minimum variations between the desired input temperature and the temperature of the removed vapors. When the vapors are recirculated, they also become and remain saturated with the vapor of the emulsifying liquid such as water in the emulsification of a wax mixture. Because of this continued saturation, no vaporization of the emulsifying liquid takes place in the centrifugal; and, hence, no drop in temperature from this cause results. It will be appreciated, however, that the discharge of the header 35 could be to the atmosphere and controlled amounts of air drawn into the housing of the centrifugal. In such case, heating and saturating means should be provided as by means of a steam jet, (not shown).

Ordinarily, atmospheric air will be circulated through the centrifugal. In case a solvent has been used it may be desirable to use an inert gas such as a flue gas to avoid possible danger from explosions. When a solvent is used, the recirculated vapors will likewise be saturated with solvent vapor.

The tendency of the machine to heat up by the loss of heat from the heating coils 24 and because of the heat effect of the power of the machine, is, of course, readily compensated for by the temperature of the heat transfer media in the housing as well as the temperature at which the unit heater is kept. Without recirculation of vapors and with free inlet of air, the tendency is for the machine to cool off because of the rapid removal of heat; whereas, with recirculation the machine and housing must be cooled in parts to remove the heat due to windage and the power input. In either case, a coarse temperature adjustment is accomplished by the air regulation and a fine adjustment can be obtained by the quantity of the water passing through the heat exchanger 36 and by the settings of the various dampers.

It will, of course, be understood that in practice the separation of materials in a large centrifuge may justify the necessary automatic temperature controllers and indicating thermometers which would be placed at the desired points. In such case automatic control would assure the continued delivery of desired products without possibility of any clogging due to congealing of the filtrate or feed by the control of both the internal and external circulation of the gaseous atmosphere.

While I have shown and described a preferred manner of carrying out my invention, I am aware that modifications may be made thereto; therefore, only such limitations as appear in the claims appended hereinafter should be applied.

I claim:

1. In the continuous separation of a mixture of materials having different melting points wherein such mixture is emulsified in liquid condition with a liquid inert and non-solvent with respect to said materials and the resulting emulsion is cooled until the material to be separated has solidified and wherein the cooled emulsion is continuously fed into one end of a centrifugal separator, from which the liquid of the emulsion separated from the solid is removed, and wherein the resulting separated solid is continuously moved in an axial direction and discharged from the other end of the separator and wherein a temperature sufficient to maintain said separated liquid in liquid condition is created at the feed end region of the separator and a higher temperature sufficient to melt the discharged solid is created in a region adjacent the solid discharge end of the separator whereby a temperature gradient is set up between the ends of the separator, the steps of controlling said temperature gradient which comprise performing said separation in a confined space to exclude the external atmosphere, adjusting the temperature of a gaseous medium, saturating such gaseous medium with the vapors of said non-solvent liquid, continuously introducing said vapor-saturated, temperature-conditioned gaseous medium into said confined space, controlling the amount of such gaseous medium so introduced whereby the temperature and vapor content of the atmosphere within said confined space are controlled, passing such introduced medium through the separator countercurrent to said axially moving solid material to maintain said temperature gradient, continuously withdrawing said vapor-saturated temperature-conditioned gaseous medium from said confined space, and controlling said withdrawal of said vapor-saturated gaseous medium to control the circulation of the gaseous medium within said confined space and separator.

2. The method as claimed in claim 1, which includes separately withdrawing portions of said vapor-saturated gaseous medium from said confined space at said high and low temperature regions respectively, and controlling the amounts of the gaseous medium withdrawn from said regions individually.

3. In the continuous separation of a wax-oil mixture wherein such mixture is emulsified in liquid condition with a liquid inert and non-solvent with respect to the materials of said mixture and the resulting emulsion is cooled until the wax to be separated has solidified, the steps which comprise feeding such chilled, partially solidified emulsion into one end of a centrifugal filter and therein separating the solidified wax as a filter cake from the remaining liquid as a filtrate, maintaining the atmospheric conditions for such separation independent of the external atmospheric conditions by substantially enclosing said filter in a housing, permitting the filter cake to continuously move in an axial direction across the filter surface and to continuously discharge through the other end of the filter and into the housing, establishing about the zone of the filtrate separation a temperature sufficient to prevent congealing of the filtrate, establishing a higher temperature about the zone of cake discharge sufficient to melt such cake after discharge thereof whereby a temperature gradient axially of said filter and housing is set up, introducing into the filter a current of a gas simultaneously with the chilled, partially solidified emulsion, adjusting the temperature of such gas to at least the separating temperature and saturating such gas with vapors of said non-solvent liquid, withdrawing portions of said vapor-saturated gas from said housing with the filtrate and the filter cake, and controlling said axial temperature gradient by causing said vapor-saturated gas to circulate through the filter countercurrent to the axially moving filter cake and through said different temperature zones by the rotation of the filter and by controlling the amounts of such vapor-saturated gas withdrawn with the filtrate and the filter cake individually.

4. In the continuous separation of a wax-oil mixture wherein such mixture is emulsified in liquid condition with a liquid inert and non-solvent with respect to the materials of said mixture and the resulting emulsion is cooled until the wax to be separated has solidified, the steps which comprise feeding such chilled, partially solidified emulsion into one end of a centrifugal filter and therein separating the solidified wax as a filter cake from the remaining liquid as a filtrate, maintaining the atmospheric conditions for such separation independent of the external atmospheric conditions by substantially enclosing said filter in a housing, permitting the filter cake to continuously move in an axial direction across the filter surface and to continuously discharge from the opposite end of the filter, withdrawing the material of the discharged filter cake from the housing at a region spaced along the axis of rotation of the filter from said first withdrawal region and adjacent the zone of cake discharge from the filter, establishing about the zone of the filtrate seperation a temperature sufficient only to prevent congealing of the filtrate, establishing a higher temperature within a region adjacent to the zone of cake discharge sufficient to melt such cake after discharge thereof whereby a temperature gradient axially of said filter and housing is set up, maintaining within said housing a gas substantially saturated with vapors of said non-solvent liquid, withdrawing portions of such vapor-saturated gas from said housing with the filtrate and the filter cake, separating such withdrawn gas and reintroducing it into the housing, adjusting the temperature of the gas so introduced into the housing to at least the separating temperature while maintaining such gas substantially saturated with vapors of said non-solvent liquid, and controlling said axial temperature gradient by causing said vapor-saturated gas to circulate through the filter countercurrent to the axially moving filter cake and through said different temperature zones by the rotation of the filter and by controlling the amounts of such vapor-saturated gas withdrawn with the filtrate and the filter cake individually.

5. The method as claimed in claim 3, which includes washing the filter cake during its axial movement through an intermediate zone within the filter, separately collecting the resulting intermediate filtrate, withdrawing a portion of the said vapor-saturated gas with said intermediate filtrate, and maintaining an intermediate temperature within this zone by controlling the amount of gas so withdrawn.

6. In a centrifugal filter including a rotatable filter drum having a circumferential filter medium and open at one end for continuous discharge of filter cake axially of the drum and means for continuously feeding a mixture of solid and liquid into said drum adjacent the opposite end thereof, a housing surrounding said drum to exclude the external atmosphere, said housing having therein a filtrate collection chamber adjacent the feed end of the drum to receive the filtrate for discharge from said housing, collecting means within the housing adjacent the open end of the drum to receive the discharged filter cake for discharge from said housing, means to heat-condition the materials in said chamber and said cake collecting means differentially to produce an upward temperature gradient from the chamber to the cake collecting means, means to introduce a controlled amount of gas into said housing, outlet conduits from the chamber and the cake collecting means respectively to withdraw said gas from the housing, said gas introducing means, said outlet conduits and said filter drum being correlated for passage of the gas through the drum countercurrent to the filter cake in the axial passage of the latter to the open end of the drum upon rotation of the drum, and means to control the amounts of gas so withdrawn through said conduits individually to control the temperature and vapor content of the atmosphere within said housing and to control said temperature gradient.

7. In a centrifugal filter including a rotatable filter drum having a circumferential filter medium and open at one end for continuous discharge of filter cake axially of the drum, means for continuously feeding a mixture of solid and liquid into said drum adjacent the opposite end thereof, and means to introduce wash liquid into said drum for washing filter cake at a point intermediate the ends of the drum, a housing surrounding said drum to exclude the external atmosphere, said housing having therein a filtrate collection chamber adjacent the feed end of the drum to receive the filtrate, collecting means within the housing adjacent the open end of the drum to collect the discharged filter cake, collecting means within the housing intermediate the ends of the drum to receive the intermediate wash filtrate, means to heat-condition the materials in the chamber and the collecting means differentially to produce an upward temperature gradient from the chamber to the cake collecting means, outlet conduits for the chamber and the two collecting means respectively to separately conduct the materials collected therein from the housing and to also withdraw a gas from said housing along with said materials, means to introduce a gas in controlled amounts into said housing, said gas introducing means, said outlet conduits and said filter drum being correlated for passage of the gas through the drum countercurrent to the filter cake in the axial passage of the latter to the open end of the drum upon rotation of the drum, and means to control the amounts of gas so withdrawn through said conduits individually to control the temperature and vapor content of the atmosphere within said housing and to control said temperature gradient.

8. The apparatus as claimed in claim 7, which includes heat-conditioning means to adjust the temperature of the incoming gas and means to maintain such gas substantially saturated with vapors of the liquid.

9. In a centrifugal filter including a rotatable filter drum having a circumferential filter medium and open at one end for continuous discharge of filter cake axially of the drum, means for continuously feeding a mixture of solid and liquid into said drum adjacent the opposite end thereof, and means to introduce wash liquid into said drum for washing filter cake at a point intermediate the ends of the drum, a housing surrounding said drum to exclude the external atmosphere, said housing having therein a filtrate collection chamber adjacent the feed end of the drum to receive the filtrate, collecting means within the housing adjacent the open end of the drum to collect the discharged filter cake, collecting means within the housing intermediate the ends of the drum to receive the intermediate wash filtrate, means to heat-condition the materials in the chamber and the collecting means differentially to produce an upward temperature gradient from the chamber to the cake collecting means, outlet conduits for the chamber and the two collecting means respectively to separately conduct the materials collected therein from the housing and to also withdraw from said housing along with said materials vapor-saturated gas comprising the atmosphere within the housing, means to control the amounts of gas so withdrawn through said conduits individually, means to separate such withdrawn gas from the withdrawn material, heat-conditioning means to adjust the temperature of said separated gas, means to return such temperature-conditioned gas to the housing, and means to control the amount of such gas so returned, said gas-returning means, said outlet conduits and said filter drum being correlated for passage of the gas through the drum countercurrent to the filter cake in the axial passage of the latter to the open end of the drum upon rotation of the drum.

AUGUST HENRY SCHUTTE.